United States Patent
Eijsbouts

(10) Patent No.: US 6,509,291 B2
(45) Date of Patent: *Jan. 21, 2003

(54) PROCESS FOR SULFIDING A CATALYST CONTAINING AN S-CONTAINING ADDITIVE

(75) Inventor: Sonja Eijsbouts, Nieuwkuijk (NL)

(73) Assignee: Akzo Nobel N.V. (NL)

( * ) Notice: Subject to any disclaimer, the term of this patent is extended or adjusted under 35 U.S.C. 154(b) by 9 days.

This patent is subject to a terminal disclaimer.

(21) Appl. No.: 09/829,624

(22) Filed: Apr. 10, 2001

(65) Prior Publication Data

US 2002/0000394 A1 Jan. 3, 2002

Related U.S. Application Data

(60) Provisional application No. 60/199,767, filed on Apr. 26, 2000.

(30) Foreign Application Priority Data

Apr. 11, 2000 (EP) .............................................. 00201295

(51) Int. Cl.⁷ .......................... B01J 27/02; B01J 31/00; B01J 27/047; B01J 27/051; B01J 23/00
(52) U.S. Cl. ....................... 502/216; 502/168; 502/219; 502/220; 502/221; 502/222; 502/223; 502/313; 502/314
(58) Field of Search ........................ 502/216, 219–223, 502/168, 313, 314

(56) References Cited

U.S. PATENT DOCUMENTS

| | | | |
|---|---|---|---|
| 3,324,045 A | 6/1967 | Mason ........................ | 252/439 |
| 4,028,227 A | 6/1977 | Gustafson ................... | 208/216 |
| 4,213,850 A | 7/1980 | Riddick, Jr. et al. ........ | 208/216 |
| 4,636,487 A | 1/1987 | Parrott et al. ................ | 502/168 |
| 4,981,828 A * | 1/1991 | Takahashi et al. .......... | 502/168 |
| 4,997,801 A * | 3/1991 | Mitarai et al. ............... | 502/168 |
| 5,045,518 A | 9/1991 | Heinerman et al. ......... | 502/216 |
| 5,139,990 A | 8/1992 | de Jong et al. ............. | 502/216 |
| 5,750,923 A | 5/1998 | Wu .......................... | 174/35 R |

FOREIGN PATENT DOCUMENTS

| | | | | |
|---|---|---|---|---|
| EP | 0 289 211 A1 | 11/1988 | ............ | B01J/31/02 |
| EP | 0 300 629 A1 | 1/1989 | ............ | C10G/49/06 |
| EP | 0 388 788 B1 | 10/1989 | ............ | B01J/37/20 |
| EP | 0 357 295 A2 | 3/1990 | ............ | C10G/49/04 |
| EP | 0 496 592 A1 | 7/1992 | ............ | C10G/45/08 |
| EP | 0 506 206 A1 | 9/1992 | ............ | B01J/37/20 |
| EP | 0 897 748 a1 | 2/1999 | ............ | B01J/33/00 |

OTHER PUBLICATIONS

Chemical Abstract for NL 8900–914–A, Nov. 1990.
*Catalysis Today*, vol. 10; 1991; pp. 345–352 The Effect of Passivation on the Activity of Sulfided Mo AND Co–Mo Hydrodesulphurization Catalysts; V.M. Browne et al. month N/A.
*Journal of Catalysis*, vol. 144; 1993; pp. 579–596; The Effect of Passivation on the Activity and Structure of Sulfided Hydrotreating Catalysts; Louwers, et al, Jun. 1993.
European Search Report EP 00 20 1295.

* cited by examiner

*Primary Examiner*—Mark L. Bell
*Assistant Examiner*—Patricia L Hailey
(74) *Attorney, Agent, or Firm*—Louis A. Morris

(57) ABSTRACT

The present invention pertains to a process for sulfiding a catalyst composition comprising at least one hydrogenation metal component of Group VI and/or Group VIII of the Periodic Table, and an S-containing organic additive wherein the catalyst composition is first contacted with an organic liquid, followed by the catalyst being contacted with hydrogen and a sulfur-containing compound in the gaseous phase. The invention also pertains to the sulfided catalyst composition and its use in hydrotreating. Catalysts sulfided by the process according to the invention show a higher activity than the same catalysts which have not been sulfided. It is preferred to carry out the process according to the invention ex situ, where it solves the problem of difficult start-up and the formation of undesirable side products in the hydrotreating unit. The organic liquid may be a hydrocarbon with a boiling range of about 150–500° C., preferably white oil, gasoline, diesel, gas oil, or mineral lube oil. The S-containing organic additive preferably is a mercapto-compound, more preferably a mercaptocarboxylic acid represented by the general formula HS—R1—COOR, wherein R1 stands for a divalent hydrocarbon group with 1- about 10 carbon atoms and R stands for a hydrogen atom, an alkali metal, an alkaline earth metal, ammonium, or a linear or branched alkyl group having 1 to about 10 carbon atoms.

29 Claims, No Drawings

PROCESS FOR SULFIDING A CATALYST CONTAINING AN S-CONTAINING ADDITIVE

CROSS REFERENCE TO RELATED APPLICATIONS

This application claims priority from European Patent Application No. 00201295.3, filed Apr. 11, 2000 and U.S. Provisional Patent Application No. 60/199,767, filed Apr. 26, 2000.

BACKGROUND OF THE INVENTION

1. Field of the Invention

The present invention relates to a process for sulfiding catalysts containing an S (sulfur)-containing organic additive, in particular a hydrotreating catalyst containing an S-containing organic additive.

2. Prior Art

Hydrotreating catalysts comprise hydrogenation metal components, generally a Group VI metal component such as molybdenum and/or tungsten and a Group VIII metal component, such as nickel and/or cobalt, generally on an oxidic carrier. Before use, the hydrogenation metal components present in hydrotreating catalysts will generally be converted into their sulfides. This process is conventionally indicated as sulfidation or presulfidation. It is generally done before the catalyst is used in hydrotreating to ensure a stable reactor performance.

Hydrotreating catalysts containing S-containing organic additives are known in the art. The addition of the S-containing organic additive is often intended to preclude the necessity of a separate presulfiding step.

For example, European patent application 0 300 629 and European patent application No. 0 357 295 describe hydrotreating catalysts comprising a support impregnated with at least one member of molybdenum, tungsten, and/or Group VIII of the Periodic Table, and a mercapto-compound selected from mercaptocarboxylic acids, amino-substituted mercaptanes, di-mercaptanes, and thioacids. The S-containing additive is incorporated into the catalyst composition to obviate the necessity of presulfiding, or at least make the presulfiding less difficult. In particular, the S-containing additive is incorporated into the catalyst to obviate the necessity of dedicating the initial part of the reactor start-up to providing the catalyst with the amount of sulfur needed to attain equilibrium with the reaction environment, or to shorten the time necessary for doing so. Additionally, the necessity of spiking the feed with a sulfur-containing compound such as DMDS is lessened or obviated. Further, since all catalyst particles already contain S when they enter the unit, the homogeneity of the sulfided product will be improved.

European patent application No. 0 506 206 also describes a hydrotreating catalyst comprising an S-containing additive selected from the group of bi-mercaptanes, aminosubstituted mercaptanes, and thiocarboxylic acids. The S-containing catalyst is again intended to avoid the necessity of presulfiding. Some of the catalysts described in this reference are activated by a treatment with hydrogen at a temperature from room temperature up to 400° C., preferably 100–300° C.

Similar subject-matter is described in European patent application No. 0 338 788, and European patent application No. 0 289 211.

U.S. Pat. No. 5,139,990 describes a hydrotreating catalyst comprising a carrier and hydrogenation metal components which is treated with an aqueous medium comprising a water-soluble or water-miscible S-containing organic additive, followed by drying the resulting catalyst and activating it with hydrogen at a temperature of 100–600° C.

U.S. Pat. No. 4,636,487 describes a hydrotreating catalyst comprising a support and a hydroxymercaptide of one or more metals, which may be the reaction product of a mercaptoalcohol and one or more metal compounds. The catalyst may be activated with hydrogen at a temperature of 66–316° C.

European patent application No. 0 496 592 describes a hydrotreating catalyst comprising a carboxylic acid and an organic sulfur compound which may be a mercaptocarboxylic acid. The amount of organic sulfur compound is so low that the catalyst still needs to be presulfided. No information is given as to how this presulfidation step should be carried out.

U.S. Pat. No. 4,213,850 describes liquid phase presulfiding followed by gas phase presulfiding, where in the liquid phase presulfiding a non-spiked feed is used. U.S. Pat. No. 5,045,518 describes a process in which a catalyst is first sulfided ex situ followed by an in situ sulfidation.

Although the activity of these catalysts is good, there still is room for improvement. Additionally, it has appeared that when the catalysts of the above references are brought into the hydrotreating unit, undesirable components such as acetic acid may be formed during the start-up. Additionally it was found that the start-up procedure is rather critical to obtain good results.

SUMMARY OF THE INVENTION

In one embodiment, the present invention is a sulfidation process in which a catalyst composition comprising at least one hydrogenation metal component of Group VI and/or Group VIII of the Periodic Table, and an S-containing organic additive is first contacted with an organic liquid, followed by the catalyst being contacted with hydrogen and a sulfur-containing compound in the gaseous phase.

In a second embodiment, our invention is a catalyst obtained by the above process.

In a third embodiment, our invention is a process for hydrotreating a hydrocarbon feed by contacting the feed with the above catalyst at hydrotreating conditions.

Other embodiments of our invention encompass details about reactant compositions, process steps and conditions, etc., all of which are hereinafter disclosed in the following discussion of each of the facets of our invention.

DETAILED DISCRIPTION OF THE INVENTION

The sulfidation process

It has appears that catalysts with a higher activity may be obtained if the catalysts are sulfided by way of the above process.

In the process according to the invention, the additive-containing catalyst is first contacted with an organic liquid. The organic liquid generally has a boiling range of about 100–550° C., preferably about 150–500° C. It generally is a petroleum fraction. By their nature, petroleum fractions comprise less than about 12 wt. % of oxygen. Petroleum fractions comprising less than about 8 wt. % of oxygen, preferably less than about 5 wt. %, more preferably less than about 2 wt. %, specifically less than about 0.5 wt. % of oxygen, may be preferred. Although the olefin content of the organic liquid is not critical to the process according to the invention, petroleum fractions with and iodine number of about 50 or less, specifically about 30 or less, may be preferred. Examples of suitable petroleum fractions include fractions comprising heavy oils, lubricating oil fractions like mineral lube oil (360° C.<BP<500° C.), atmospheric gas oils, vacuum gas oils, straight run gas oils (250° C.<BP<350° C.), white spirit (180° C.<BP<220° C.), middle distillates like diesel, jet fuel and heating oil, naphthas, and gasoline. Preferably white oil, gasoline, diesel, gas oil, or mineral lube oil is used.

The organic liquid ensures that the catalyst is able to withstand the conditions prevailing during the actual sulfidation step, that is, during the contacting of the catalyst with hydrogen and a sulfur-containing compound. The organic liquid is not particularly intended to bring sulfur into the catalyst. Nevertheless, petroleum cuts such as a gas oil or diesel may sometimes contain sulfur. Generally, the organic liquid will contain less than about 10 wt. % of sulfur, preferably less than about 5 wt. %. The amount of sulfur added with the organic liquid will be less than about 40%, preferably less than about 35% of the total amount of sulfur added to the catalyst and by way of the sulfur-containing compound applied in the gaseous phase, more preferably less than about 25%, even more preferably less than about 15%.

The amount of organic liquid used generally is about 20–500% of the catalyst pore volume which can be filled with the liquid at issue under the conditions of application of the liquid. The pore volume can easily be determined by slowly adding liquid under said conditions to a certain amount of catalyst in a closed flask while shaking and determining by visual inspection when the liquid is no longer adsorbed. Another method is to add excess liquid and to remove the excess from the catalyst, e.g., by centrifugation. The person skilled in the art of pore volume impregnation is familiar with these procedures. To get the desired effect and avoid waste of material an amount of about 50–200%, more in particular about 50–125%, is preferred. Evidently, if excess liquid is present it can easily be removed, e.g., by drying the catalyst.

The way in which the catalyst is contacted with the organic liquid is not critical to the invention as long as it is ensured that each catalyst particle is contacted with the organic liquid. Conventional mixing methods may be applied. The organic liquid is generally contacted with the catalyst particles at a temperature between room temperature and about 200° C. Increased temperatures may sometimes be desired because they decrease the viscosity of the liquid.

The suitable contacting time may depend on whether the operation is carried out ex situ or in situ. If this process is carried out ex situ (outside the hydrotreating reactor), the problems associated with the formation of undesirable side products in the hydrotreating unit and critical start-up operations can also be avoided. For ex situ operation the temperature may preferably be between room temperature and about 75° C.

For in situ operation the temperature may preferably be between about 100 and 175° C. The contacting of the catalyst with organic liquid is carried out in the substantial absence of hydrogen.

After the incorporation of an organic liquid, the catalyst is contacted in the gaseous phase with hydrogen and a sulfur-containing compound. The sulfur-containing compound is $H_2S$ and/or a compound which is decomposable into hydrogen sulfide under the conditions prevailing during the contacting of the catalyst with hydrogen and a sulfur-containing compound. Examples of suitable components decomposable into $H_2S$ are mercaptanes, $CS_2$, thiophenes, dimethyl sulfide (DMS), dimethyl disulfide (DMDS), and suitable S-containing refinery outlet gasses. The use of $H_2S$ alone is preferred. The skilled person knows how to select a sulfur compound which will decompose under the conditions applied.

The total amount of sulfur-containing compound which is incorporated into the catalyst in the process according to the invention, including the amount of sulfur added by way of the S-containing additive is generally selected to correspond to about 50–300%, preferably about 70–200%, more preferably about 80–150%, of the stoichiometric sulfur quantity necessary to convert the hydrogenation metals into $Co_9S_8$, $MoS_2$, $WS_2$, and $Ni_3S_2$, respectively.

The concentration of sulfur-containing compound in the mixture of $H_2$ and sulfur-containing compound is generally selected to be between about 1 and about 99 wt. %, preferably between about 10 and about 80%, calculated as $H_2S$ on the total of $H_2S$ and hydrogen. Of course, lower sulfur concentrations in this mixture will either lengthen the duration of this process step or increase the required space velocity. The application of gas recycle may be attractive.

The contacting in the gaseous phase with hydrogen and a sulfur-containing compound can be done in one step. In that case, it is preferably carried out at a temperature of about 150–450° C., preferably about 225–400° C.

Catalysts with a higher activity may be obtained when the contacting in the gaseous phase with hydrogen and a sulfur-containing compound is carried out in two steps, with the first step being performed at a lower temperature than the second step. In this embodiment the first step is generally carried out at a temperature of about 100–250° C., preferably about 150–225° C. The second step is generally carried out at a temperature of about 150–450° C., preferably about 200–400° C., more preferably about 225–400° C. In this two-step embodiment, the gaseous mixtures of $H_2$ and sulfur-containing compound applied in the two steps may be the same or different. If so desired, this process may also be carried out in more than two steps, e.g., in three steps or in a continuous mode, as long as the first step, or the start of the process, is carried out at a lower temperature than a further step, or later part of the process.

The total pressure during the process according to the invention is not critical. It will generally be between atmospheric pressure and about 300 bar, depending on where the process is carried out. If the process is carried out ex situ, the pressure may, e.g., be between atmospheric pressure and about 10 bar. If the process is carried out in situ, the pressure may be much higher, e.g., in the range of about 25 to about 300 bar.

The contacting in the gaseous phase with hydrogen and a sulfur-containing compound can be carried out in any suitable manner, including in fixed bed processes and moving bed processes. Since the sulfiding step is exothermic by nature, it is important that the temperature of the catalyst is well-controlled. Generally, such control is easier in a moving bed process. In the context of the present specification, a moving bed process is intended to encompass all processes in which the catalyst moves relative to the reactor. Examples are ebullated bed processes and processes carried out in a rotary furnace. In the latter case, the contacting can be done either co-currently or counter-currently, with counter-current operation being preferred.

The amount of sulfur incorporated into the catalyst with the S-containing compound in the gas phase will generally be between 5 and 85% of the stoichiometric sulfur quantity necessary to convert the hydrogenation metals into $Co_9S_8$, $MoS_2$, $WS_2$, and $Ni_3S_2$, respectively. It is noted that the amount of S-containing compound with which the catalyst is contacted in the gaseous phase will be much higher than the above-mentioned stoichiometric amount, but not all sulfur will be incorporated into the catalyst.

It is also noted that the S-containing compound present in the gas phase does not refer to decomposition products from the S-containing additive already present in the catalyst, or, if any, incorporated therein with the organic liquid, but refers to S-containing compound added extraneously to the hydrogen.

The various steps of the process according to the invention can be carried out ex situ or in situ. In the context of the present specification, the term in situ means in the reactor in which the catalyst will eventually be applied to effect hydrotreating. Conversely, ex situ means outside said reactor. For example, it is possible to effect the contacting with the organic liquid ex situ while the contacting with hydrogen and a sulfur-containing compound is effected in situ, optionally with a pressure test being carried out before the contacting with hydrogen and a sulfur-containing compound. It is also possible to effect the complete process ex situ, or to effect the complete process in situ.

It is generally preferred to carry out the complete process ex situ, because this generates less downtime for the hydrotreating reactor and simplifies the reactor start-up. Additionally, in ex situ operation, any less desirable side products formed by the decomposition of the S-containing additive will not be formed in the hydrotreating unit. The sulfidation unit may often be better equipped to handle undesirable gases.

If the process according to the invention is carried out ex situ, it may be desirable to passivate the sulfided catalyst prepared in this way, since sulfided catalysts may be self-heating. Passivation can be done by contacting the sulfided catalyst with an oxygen-containing compound under controlled conditions. The use of an oxygen-containing gas, such as air, is a well-known embodiment. Alternatively, the sulfided catalyst may be passivated by being contacted with an organic liquid, such as diesel, gas oil, white spirit, or lube oil. Passivation processes are known in the art. See, for example, EP-897 748 and NL 8900914, which describe the use of hydrocarbons, and V. M. Browne, S. P. A. Louwers, and R. Prins, *Catalysis Today* volume 10 number 3 pp 345–52 (1991) and S. P. A. Louwers, M. W. J. Craje, C. Geantet, A. M. van der Kraan, and R. Prins, *Journal of Catalysis* volume 144 number 2 pp. 579–96 (1993), both of which describe the use of oxygen.

The additive-containing catalyst

In principle, the additive-containing catalyst can be any catalyst which comprises a Group VIB hydrogenation metal and/or a Group VIII hydrogenation metal, and an S-containing organic additive, generally on a carrier. Catalysts comprising the combination of a Group VIB hydrogenation metal and a Group VIII hydrogenation metal are preferred. As the skilled person will recognise, the metals may be present in any form. When they are incorporated into the catalyst composition they are often in the form of their salts or oxides. After calcination they are converted partly or wholly into their respective oxides. After sulfidation and during use the metals are at least partly present in the sulfidic form.

As Group VIB metals may be mentioned molybdenum, tungsten, and chromium. Group VIII metals include nickel, cobalt, and iron. Catalysts comprising molybdenum and/or tungsten as Group VIB metal component and nickel and/or cobalt as Group VIII metal component are the most common. The catalyst usually has a metal content in the range of about 0.1 to about 50 wt. % calculated as oxides on the dry weight of the catalyst not containing the additive. The Group VIB metal will frequently be present in an amount of about 5–40 wt. %, preferably about 15–30 wt. %, calculated as trioxide. The Group VIII metal will frequently be present in an amount of about 1–10 wt. %, preferably about 2–7 wt. %, calculated as monoxide. The catalyst may also contain other components, such as phosphorus, halogens, and boron. Particularly, the presence of phosphorus in an amount of about 1–10 wt. %, calculated as $P_2O_5$, may be preferred.

The catalyst carrier which is generally present may comprise the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier comprising alumina, silica-alumina, alumina with silica-alumina dispersed therein, or silica-coated alumina. Special preference is given to the carrier consisting essentially of alumina or alumina containing up to about 25 wt. % of other components, preferably silica. A carrier comprising a transition alumina, for example an eta, theta, or gamma alumina is preferred within this group, with a gamma-alumina carrier being especially preferred. Additionally, although at present less preferred, the catalyst may contain 0- about 60 wt. % of zeolite.

The catalyst's pore volume (measured via $N_2$ adsorption) generally is in the range of about 0.25 to about 1 ml/g. The specific surface area will generally be in the range of about 50 to about 400 $m^2/g$ (measured using the BET method). Generally, the catalyst will have a median pore diameter in the range of about 7–20 nm, as determined by $N_2$ adsorption. The figures for the pore size distribution and the surface area given above are determined after calcination of the catalyst at about 500° C. for one hour.

The catalyst is suitably in the form of spheres, pellets, beads, or extrudates. Examples of suitable types of extrudates have been disclosed in the literature (see, int. al., U.S. Pat. No. 4,028,227). Highly suitable are cylindrical particles (which may be hollow or not) as well as symmetrical and asymmetrical polylobed particles (2, 3 or 4 lobes).

The additive present in the catalyst may be any S-containing organic additive. In the context of the present specification the term organic additive refers to an additive comprising at least one carbon atom and at least one hydrogen atom.

Preferred compounds include organic compounds having at least one mercapto-group. Within the group of mercapto-compounds, mercaptocarboxylic acids represented by the general formula HS—R1—COOR, wherein R1 stands for a divalent hydrocarbon group with 1- about 10 carbon atoms and R stands for a hydrogen atom, an alkali metal, an alkaline earth metal, ammonium, or a linear or branched alkylgroup having 1 to about 10 carbon atoms. Examples include mercaptoacetic acid (HS—CH2—COOH), beta-mercaptoprioprionic acid (HS—CH2CH2—COOH), methylmercaptoacetate (HS—CH2—COOCH3), ethyl 2-mercaptoacetate (HS—H2—COOC2H5), ethylhexyl mercaptoacetate (HS—CH2—COOC8H17), and methyl 3-mercaptoproprionate ((HS—CH2CH2—COOCH3).

Further compounds preferred within the group of mercapto-compounds include aminosubstituted mercaptanes represented by the general formula H2N—R2—SH, wherein R2 stands for a divalent hydrocarbon group having 1- about 15 carbon atoms. Examples of these compounds include 2-amino ethanethiol (H2N—CH2CH2-SH), and 4-amino thiophenol (H2N—C6H4—SH).

Additional compounds within the group of mercapto-compounds are the di-mercaptanes represented by the general formula HS—R3—SH, wherein R3 stands for a divalent hydrocarbon group having 1- about 15 carbon atoms. Examples of these compounds include ethanedithiol (HS—CH2CH2—SH) and 1,4-butanedithiol (HS—(CH2)4—SH).

Preferred compounds also include thioacids of the formula R4—COSH, wherein R4 stands for a monovalent hydrocarbon group having 1- about 15 carbon atoms. Examples of these compounds include thioacetic acid (CH3—COSH) and thiobenzoic acid (C6H5COSH). Dithioacids of the formula HSOC—R5—COSH, wherein R5 is a divalent hydrocarbon group with 1- about 15 carbon atoms may also be suitable. An example is dithioadipic acid (HSOC—C4H10—COSH).

Preferred compounds also include mercaptoalcohols of the general formula R6S—R5—(OH)n, wherein R5 represents an alkyl group having from 1 to about 15 carbon atoms or a phenyl group, R6 represents a hydrogen atom or an alkyl group having 1 or 2 carbon atoms, and n is 1 or 2. Examples of these compounds include 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2,-propanediol, 3-methylthio-1,2, propanediol, and 3-ethylthio-1,2, propanediol.

Other suitable compounds include sulphoxides of the formula R7—SO—R8, wherein R7 and R8 are hydrocarbon groups with 1- about 5 carbon atoms. An example is dimethyl sulfoxide (CH3—SO—CH3).

Ammonium thiocyanate and thiourea may also be useful compounds, as may be the various dithiocarbamic acids and the salts thereof, such as ethylene bisdithiocarbamic acid and its salts, and dimethyl dithiocarbamic acid and its salts. Other suitable compounds include mercaptodiathiazoles and their salts, such as 2,5-dimercapto-1,3,4,-diathiazoles and its salts.

Other compounds which may be useful are polysulfides of the formula R9—Sx—R10, wherein x is a value of 1- about 15 and R9 and R10 are alkyl groups, preferably branched alkyl groups, with 1- about 30 carbon atoms. Related compounds are those with the formula HO—R11—Sx—R12—OH, wherein x is a value of 1 - about 15 and R11 and R12 are alkyl groups with 1 - about 8 carbon atoms.

At this point in time the mercapto-containing compounds, in particular the mercaptocarboxylic acids are considered preferred for reasons of catalyst activity. Other compounds, in particularly those which are soluble in or miscible with water may be preferred for environmental reasons (less smell and no organic solvent necessary).

A single compound as well as a combination of compounds may be used as additive.

The amount of additive present in the additive-containing catalyst depends on the specific situation. It was found that the appropriate amount of additive generally lies in the range of about 0.01–2.5 moles of additive per mole of hydrogenation metals present in the catalyst. If the amount of additive added is too low, the advantageous effect associated with its presence will not be obtained. On the other hand, the presence of an exceptionally large amount of additive will not improve its effect. Generally it is intended that the amount of sulfur incorporated into the catalyst by way of the additive is selected to correspond to about 5–200%, preferably about 50–200%, more preferably about 80–150%, of the stoichiometric sulfur quantity necessary to convert the hydrogenation metals into $Co_9S_8$, $MoS_2$, $WS_2$, and $Ni_3S_2$, respectively.

The way in which the additive is incorporated into the catalyst composition is not critical to the process according to the invention. The additive may be incorporated into the catalyst composition prior to, subsequent to, or simultaneously with the incorporation of the hydrogenation metal components.

For example, the additive can be incorporated into the catalyst composition prior to the hydrogenation metal components by being added to the carrier before the hydrogenation metal components are. This can be done by mixing the additive with the carrier material before it is shaped, or by impregnating the shaped carrier material with the additive. This embodiment is not preferred at this point in time.

Alternatively, the additive can be incorporated into the catalyst composition simultaneously with the hydrogenation metal components. This can be done, e.g., by mixing the additive and the hydrogenation metal components with the carrier material before shaping or by impregnating the carrier with an impregnation solution comprising the hydrogenation metal components and the additive, followed by drying under such conditions that at least part of the additive is maintained in the catalyst.

It is also possible to incorporate the additive into the catalyst composition subsequent to the hydrogenation metal components. This can be done, e.g., by first incorporating the hydrogenation metal components into the catalyst composition, e.g., by mixing them with the carrier material or by impregnating the carrier with them, optionally followed by drying and/or calcining, and subsequently incorporating the additive, e.g., by impregnation, optionally followed by drying under such conditions that at least part of the additive is maintained in the catalyst.

Depending on the nature of the additive and the way in which it is incorporated into the catalyst composition, the additive may be used in solid form, in liquid form, or dissolved in a suitable solvent. It may be preferred for the additive to be incorporated into the catalyst dissolved in water.

Use of the sulfided catalyst prepared according to the invention

The catalyst sulfided by the process according to the invention can be used in the hydrotreating of hydrocarbon feeds. The hydrotreating generally takes place under conventional hydrotreating conditions, such as temperatures in the range of about 250–450° C., pressures in the range of about 5–250 bar, space velocities in the range of about 0,1–10 h$^{-1}$, and H$_2$/oil ratios in the range of about 50–2000 Nl/l. Examples of suitable feeds include middle distillates, kerosine, naphtha, vacuum gas oils, heavy gas oils and residues. Preferably, the hydrocarbon feed contains at least about 0.2 wt. % of sulfur, calculated as atomic sulfur S. Examples of suitable hydrotreating reactions are (deep) hydrodesulfurisation, hydrodenitrogenation, hydrodearomatisation, and hydrodemetallisation. (Deep) hydrodesulfurisation, hydrodenitrogenation, and hydrodearomatisation are preferred.

EXAMPLE 1

Starting material

A conventional hydrotreating catalyst containing 24 wt. % molybdenum, calculated as trioxide, 4 wt. % nickel, calculated as oxide, and 7 wt. % phosphorus, calculated as $P_2O_5$, on a gamma-alumina carrier was impregnated by pore volume impregnation with a solution of HS—CH$_2$—COOH in water, containing 1 mole HS—CH$_2$—COOH per mole of the total of molybdenum and nickel. Then, the catalyst was dried rotating with hot air to a product temperature of about 100° C.

Comparative presulfiding procedure

The additive-containing starting catalyst catalyst (10 ml) was sulfided in the gas phase at atmospheric pressure using a mixture of 10 vol. % H$_2$S in H$_2$ (flow=5 l/hr) in one step. The temperature was increased by 0.5° C. per minute to 300° C. and held at that temperature for 3 hours.

One-step presulfiding according to the invention

The additive-containing starting catalyst was pore volume impregnated with SRGO (straight run gas oil) in an amount corresponding to 0.046 g SRGO per gram catalyst. This additive-containing SRGO-impregnated Ni—Mo—P/γ-Al$_2$O$_3$ catalyst (10 ml) was sulfided in the gas phase in one step in the same way as described above.

Two-Step presulfiding according to the invention

The additive-containing starting catalyst was pore volume impregnated with SRGO (straight run gas oil) in an amount corresponding to 0.46 g SRGO per gram catalyst. This additive-containing SRGO-impregnated Ni—Mo—P/γ-Al$_2$O$_3$ catalyst (10 ml) was sulfided in the gas phase at atmospheric pressure using a mixture of 10 vol. % H$_2$S in H$_2$ (flow=5 l/hr) in two steps. The temperature was first increased by 0.5° C. per minute to 180° C. and held at 180° C. for 3 hours. Then, the temperature was increased by 0.5° C. per minute to 300° C. and held at 300° C. for 3 hours.

Testing

The catalysts were tested in an upflow tubular reactor using a SRGO with the properties given in table 1. The reaction conditions are given in table 2.

TABLE 1 feedstock properties

| Type feed | Straight run gas oil |
|---|---|
| Nitrogen (ASTM D-4629) (ppmwt) | 115 |
| Sulfur (ASTM D-4294) (wt. %) | 1.2 |
| Density 15° C. (g/ml) | 0.84 |
| Dist. (° C.) (ASTM D 1160) | |
| IBP | 121 |
| 5 vol. % | 177 |
| 10 vol. % | 203 |
| 30 vol. % | 254 |
| 50 vol. % | 292 |
| 70 vol. % | 330 |
| 90 vol. % | 386 |
| 95 vol. % | 412 |
| FBP | 476 |

TABLE 2

Reaction conditions

| Temperature (° C.) | 340 |
|---|---|
| Pressure (bar) | 30 |
| H$_2$/oil (Nl/l) | 125 |
| LHSV (h-1) | 2.0 |

The oil product from the reactor was analysed, and the relative volume activities of the catalysts for hydrodenitrogenation was calculated, with the activity the starting material activated using the comparative presulfiding procedure being set at 100. The results are given in Table 3 below.

TABLE 3 test results

| | Comparative presulfiding procedure | One-step presulfiding procedure according to the invention | Two-step presulfiding procedure according to the invention |
|---|---|---|---|
| RVA HDN | 100 | 105 | 108 |

This shows that one-step presulfiding procedure according to the invention, which includes a catalyst prewetting step, results in an improved activity as compared to the comparative presulfiding procedure. The activity obtained after a two-step presulfiding procedure, which is in accordance with a preferred embodiment of the invention, was higher still.

What is claimed is:

1. A process for sulfiding a catalyst composition comprising at least one hydrogenation metal component of Group VI and/or Group VIII of the Periodic Table, and an S-containing organic additive wherein the catalyst composition is first contacted with an organic liquid, followed by the catalyst being contacted with hydrogen and a sulfur-containing compound in the gaseous phase.

2. The process of claim 1 wherein the sulfur-containing compound applied in the gaseous phase is H$_2$S.

3. The process of claim 1 wherein the organic liquid is a hydrocarbon with a boiling range of about 150–500° C.

4. The process of claim 3 wherein the organic liquid is selected from the group consisting of white oil, gasoline, diesel, gas oil and mineral lube oil.

5. The process of claim 1 wherein the organic liquid comprises less than about 12 wt. % of oxygen.

6. The process of claim 1 wherein the organic liquid comprises less than about 8 wt. % of oxygen.

7. The process of claim 1 wherein the organic liquid comprises less than about 5 wt. % of oxygen.

8. The process of claim 1 wherein the organic liquid comprises less than about 2 wt. % of oxygen.

9. The process of claim 1 wherein the organic liquid comprises less than about 0.5 wt. % of oxygen.

10. The process of claim 1 wherein the organic liquid has an iodine number of about 50 or less.

11. The process of claim 1 wherein the organic liquid has an iodine number of about 30 or less.

12. The process of claim 1 wherein the organic liquid contains less than about 10 wt. % of sulfur.

13. The process of claim 1 wherein the organic liquid contains less than about 5 wt. % of sulfur.

14. The process of claim 1 wherein the amount of organic liquid contacted with the catalyst is about 20–500% of the catalyst pore volume which can be filled with the liquid under the conditions at which contact occurs.

15. The process of claim 1 wherein the catalyst has a metal content in the range of about 0.1 to about 50 wt. % calculated as oxides on the dry weight of the catalyst not containing the organic additive.

16. The process of claim 1 wherein the Group VIB metal is present in an amount of about 5–40 wt. %, calculated as trioxide.

17. The process of claim 1 wherein the Group VIII metal is present in an amount of about 1–10 wt. %, calculated as monoxide.

18. The process of claim 1 wherein the S-containing organic additive comprises at least one carbon atom and at least one hydrogen atom.

19. The process of claim 1 wherein the S-containing organic additive is an organic compound comprising a mercapto-group.

20. The process of claim 19 wherein the S-containing organic additive is a mercapto acid represented by the general formula HS—R1—COOR, wherein R1 stands for a divalent hydrocarbon group with 1 -about 10 carbon atoms and R stands for a hydrogen atom, an alkali metal, an alkaline earth metal, ammonium, or a linear or branched alkyl group having 1 to about 10 carbon atoms.

21. The process of claim 1 wherein the S-containing organic additive is incorporated into the catalyst composition prior to, subsequent to, or simultaneously with the incorporation of the hydrogenation metal components.

22. The process of claim 1 wherein the group VI metals are selected from Mo and/or W and the group VIII metals are selected from Co and/or Ni.

23. The process of claim 22 wherein the amount of sulfur incorporated into the catalyst by way of the additive is selected to correspond to about 50–300% of the stoichiometric sulfur quantity necessary to convert the hydrogenation metals into $Co_9S_8$, $MoS_2$, $WS_2$, and/or $Ni_3S_2$, respectively.

24. The process of claim 1 wherein the contacting of the catalyst with hydrogen and a sulfur-containing compound in the gaseous phase takes place in one step at a temperature of about 150–450° C.

25. The process of claim 1 wherein the contacting of the catalyst with hydrogen and a sulfur-containing compound in the gaseous phase is carried out in two steps, with the first step being performed at a temperature which is lower than that of the second step.

26. The process of claim 25 wherein the first step is carried out at a temperature of about 100–250° C. and the second step is carried out at a temperature of about 150–450° C.

27. The process of claim 1 wherein both the contacting with the organic liquid and the contacting with hydrogen and a sulfur-containing compound are carried out ex situ.

28. The process of claim 27 wherein the ex situ sulfided catalyst is passivated after the treatment with hydrogen and the sulfur-containing compound.

29. A catalyst obtained by the process of claim 1.

* * * * *